United States Patent [19]
Morrison

[11] Patent Number: 5,395,697
[45] Date of Patent: Mar. 7, 1995

[54] EPOXY COATING COMPOSITIONS WITH METAL-CONTAINING STABILIZERS AND ARTICLES MADE THEREWITH

[75] Inventor: Eric D. Morrison, West St. Paul, Minn.

[73] Assignee: Minnesota Mining and Manufacturing Company, St. Paul, Minn.

[21] Appl. No.: 209,228

[22] Filed: Mar. 11, 1994

Related U.S. Application Data

[62] Division of Ser. No. 5,597, Jan. 19, 1993, Pat. No. 5,314,980.

[51] Int. Cl.$^6$ .................................. B32B 27/36
[52] U.S. Cl. ............................ 428/412; 428/429; 428/447; 428/450; 428/451; 428/452; 528/15; 528/18; 528/19; 528/28; 528/38; 528/40
[58] Field of Search .................. 528/15, 18, 19, 28, 528/38, 40; 428/447, 450, 451, 452, 412, 429

[56] References Cited

U.S. PATENT DOCUMENTS

| | | | |
|---|---|---|---|
| 3,961,977 | 6/1976 | Koda et al. | 106/287 |
| 4,100,134 | 7/1978 | Robins et al. | 528/10 |
| 4,127,697 | 11/1978 | Laurin | 428/412 |
| 4,191,804 | 3/1980 | Weber | 428/409 |
| 4,378,250 | 3/1983 | Treadway et al. | 106/287 |
| 4,800,122 | 1/1989 | Sallavanti et al. | 428/412 |

FOREIGN PATENT DOCUMENTS 3-50774  8/1991  Japan ............................ C08J 7/04

*Primary Examiner*—Melvyn I. Marquis
*Attorney, Agent, or Firm*—Gary L. Griswold; Walter N. Kirn; Steven E. Skolnick

[57] ABSTRACT

A coating composition comprises an epoxy silane, an amine hardener that can react with the epoxy silane to form a cross-linked coating, and a stabilizer that includes a sufficient amount of a metal component to delay cross-linking between the epoxy silane and the amine hardener. The coating composition has a shelf life of at least 3 days.

22 Claims, No Drawings

EPOXY COATING COMPOSITIONS WITH METAL-CONTAINING STABILIZERS AND ARTICLES MADE THEREWITH

This is a division of application Ser. No. 08/005,597, filed Jan. 19, 1993, now U.S. Pat. No. 5,314,980.

BACKGROUND OF THE INVENTION

1. Field of the Invention

This invention relates to abrasion resistant coatings for polymeric substrates, especially polymeric ophthalmic devices, and, more particularly, to an amine hardened epoxy silane coating composition having a shelf life that has been extended by the addition of a metal-containing stabilizer.

2. Description of the Related Art

Polymeric (i.e., plastic) materials are increasingly being used to replace glass because of their low weight and impact resistance. However, plastics are softer than glass and scratch and abrade more easily. This is particularly problematic when plastics are used for ophthalmic devices such as eyeglass lenses where minor scratches or abrasions may greatly impair their function. Consequently, considerable efforts have been devoted to developing scratch and abrasion resistant coatings for plastic substrates.

For example, U.S. Pat. No. 3,961,977, "Coating Compositions and Process for Producing Coated Articles," issued Jun. 8, 1976 to H. Koda et al., discloses a transparent, scratch resistant coating comprising a partially hydrolyzed carbon-functional silane derived from an aminoalkylalkoxysilane having primary and/or secondary amine groups and an epoxyalkylalkoxysilane. Reportedly, the improved abrasion resistance results from a cross-linking reaction between the epoxy groups and the amine groups. Upon mixing, the two materials yielded a solution that reportedly remained stable at 50° C. for more than thirty days.

U.S. Pat. No. 4,378,250, "Organosilicone Coating Compositions," issued Mar. 29, 1983, to G. Treadway et al., discusses the previous patent and states that the "stability of the coating solutions disclosed in U.S. Pat. No. 3,961,977 is achieved by high dilution, which is undesirable in that necessary (desirable) film thickness can only be achieved by the application of several coats. Also, compositions as taught by this patent are believed to be inferior in abrasion resistance and have been criticized in the literature as having poor resistance to weathering, to developing cracks, and/or to peel and humidity."

Treadway et al. disclose coating compositions comprising an organic solvent and at least two other components dissolved therein. One component is a nitrogen-containing, partially hydrolyzed condensate derived from an aminoalkylalkoxysilane precursor. The second component is an epoxy-containing, partially hydrolyzed compound derived by partial hydrolysis from an epoxyalkylalkoxysilane precursor. The first component may be an imine which reportedly extends the working life of the coating composition. It is believed that the imine is in equilibrium with free amine and that this equilibrium inhibits the reaction between the amine and the epoxy functionality of the second component because of the limited availability of free amine. However, when the coating composition is heated during use, the equilibrium is disturbed, more amine is generated, and the amine and epoxy functionalities cross-link.

The Treadway et al. patent is discussed in U.S. Pat. No. 4,800,122 "Siloxane-Based Tintable Coating," issued Jan. 24, 1989 to R. Sallavanti et al., which states that "considerable room for improvement remains in terms of abrasion resistance and tintability." Sallavanti et al. employ a non-silane-based aliphatic polyamine which is reacted with a ketone or an aldehyde, presumably to form an imine. This material is mixed with a partially hydrolyzed epoxysilane which regenerates the polyamine. The regenerated polyamine ultimately reacts with the epoxy groups of the epoxy silane to form a cross-linked polymeric network.

U.S. Pat. No. 4,127,697 "Abrasion-Resistant Lenses and Process of Making," issued Nov. 28, 1978 to B. Laurin, discloses the use of a tie-coat to improve adhesion of an abrasion resistant coating to a plastic substrate.

Preferably, coating compositions for plastic ophthalmic lenses should offer features in addition to abrasion resistance. For example, the compositions should be storage stable (i.e., have an extended shelf life). Many previously known compositions are "two part" formulations that require mixing two materials (which then react) to provide the ultimate composition. However, two part formulations react rapidly after mixing and must be used quickly. This may be inconvenient, wasteful and expensive. A user of the coating composition must maintain separate inventories of the two materials and can only mix them shortly before use. To effectively use the coating composition may require preparing a significantly larger volume than is actually needed. Since the compositions rapidly become unusable, expensive materials may be wasted.

The Koda et al. patent attempts to address this problem and effectively provides a "one part" system that reportedly remains stable for up to 30 days after mixing. However, Treadway et al. observed that stability was achieved by high dilution which requires several coatings to obtain the desired film thickness.

Coating compositions for ophthalmic devices must also be readily tintable to provide lenses of various shades so as to satisfy consumer demands. Sallavanti et al. characterize the Treadway et al. patent as leaving considerable room for improvement in terms of tintability.

SUMMARY OF THE INVENTION

In general, this invention relates to a coating composition comprising an epoxy silane, an amine hardener that can react with the epoxy silane to form a cross-linked coating, and a stabilizer that includes a sufficient amount of a metal atom or metal ion to delay cross-linking between the epoxy silane and the amine hardener.

The stabilizer sufficiently delays cross-linking between the epoxy silane and the amine hardener so as to provide a storage stable, one-part coating composition that has a shelf life at room temperature of at least 3 days, more preferably at least 7 days, and most preferably at least 14 days. Furthermore, the coating compositions of the invention may be applied to a wide variety of substrates including polymers, metals, ceramics, glass, wood and paper. The compositions readily adhere to such substrates and provide abrasion resistant coatings for the resulting articles. In addition, the coating compositions of the invention are tintable and dyeable, and, as a result, are particularly useful for coating polymeric ophthalmic devices such as eyeglass lenses, contact lenses and the like.

A wide variety of epoxy silanes may be used in the coating compositions of the invention. Preferably they comprise epoxy terminated silanes and aqueous solutions thereof, as well as partially condensed and prepolymerized epoxy terminated silanes. A particularly preferred epoxy silane is γ-glycidoxypropyltrimethoxy silane. Various non-silyl organic epoxies may be included as additives.

Virtually any primary or secondary amine hardener whether aromatic, aliphatic or cycloalaphatic may be used. Preferably, the amine is nonvolatile to simplify reaction with the epoxy silane and has the ability to form organometallic complexes by chelation. Diamines are particularly preferred as are aminosilanes, although non-silane amines may be also be used.

The stabilizer includes a metal component that is believed to be temporarily and reversibly coordinated by the amine, thereby forming an organometallic complex. Preferably, the organometallic complex is formed by chelation. Useful stabilizers are based on compounds that contain metal ions having +1, +2 or +3 oxidation states. Preferably, the metal component is based on the transition elements comprising groups 8 to 12 (inclusive) of the Periodic Table of the Elements. However, useful elements may also be found in groups 13 and 14 if they can form ions having +1 or +2 oxidation states. Suitable atoms or ions are based on silver, cadmium, cobalt, copper, iron, nickel, lead, palladium, ruthenium, tin and zinc. The stabilizer may be provided as a metal salt, a metal compound or a metal complex.

A 0.75:1 molar ratio of metal atom or metal ion to amine hardener is sufficient to provide a stabilizing effect on the coating compositions of the invention, although a molar ratio of about 1:1 is more preferred.

DETAILED DESCRIPTION OF THE PREFERRED EMBODIMENTS

This invention relates to abrasion-resistant coating compositions for polymeric (i.e., plastic) substrates. The coating compositions are preferably tintable or dyeable, a particularly desirable attribute when the compositions are used to coat plastic ophthalmic devices such as eyeglass lenses and the like. Importantly, the coating compositions of the invention display an extended shelf life at room temperature. That is, they are storage stable.

Coating compositions according to the invention generally comprise the reaction product of an epoxy silane and an amine (sometimes referred to herein as an amine hardener). Upon mixing, the epoxy silane and the amine hardener cure (i.e., cross-link) to provide an abrasion resistant coating. Advantageously it has been discovered that the amine can be stabilized against rapid reaction with the epoxy silane by including a metal component (i.e., a metal atom or metal ion) containing stabilizer in the composition. It is believed that the amine reversibly coordinates the metal component of the stabilizer thereby forming an organometallic complex that temporarily renders the amine unavailable for reaction with the epoxy silane. As a result, the compositions of the invention provide useful one-part coating formulations.

Epoxy silanes useful in the invention preferably comprise epoxy terminated silanes, aqueous prehydrolysis products thereof, and partially condensed or prepolymerized epoxy terminated silanes or epoxy terminated siloxanes. The expression "epoxy silane" as used herein includes each of these. Epoxy silanes having the formula (I) below are preferred.

$$(Q-R)_{4-a-b}Si(R^1)_a(OR^2)_b \quad (I)$$

Q is an epoxy group-containing radical, preferably one having either structure (II) or (III) below.

 (II)

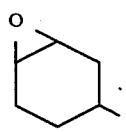 (III)

R is a divalent organic radical which links the epoxy group-containing radical (Q) and the silyl $(Si(R^1)_a)$ group and may be a non-hydrolyzable aliphatic, aromatic or aliphatic/aromatic hydrocarbon moiety having less than 20 carbon atoms or a moiety having less than 20 carbon atoms and further comprising an ether or a thioether linkage. No two heteroatoms (i.e., atoms other than carbon or hydrogen) may be adjacent in the backbone of the divalent radical.

$R^1$ is preferably a monovalent aliphatic hydrocarbon radical of less than 10 carbon atoms. Preferably, $R^2$ is either an aliphatic hydrocarbon radical having less than 10 carbon atoms, an acyl radical having less than 10 carbon atoms, or a radical of the general formula $(CH_2CH_2O)_dZ$ in which d is an integer greater than or equal to 1 and Z is either hydrogen or an aliphatic hydrocarbon radical having less than 10 carbon atoms. The value of a is 0 or 1 and b is 2 or 3. The sum of a and b is less than or equal to 3.

Epoxy silanes useful in the practice of this invention are described in U.S. Pat. No. 4,100,134 (Robins et al.), which patent is herein incorporated by reference. A particularly preferred epoxy silane is γ-glycidoxypropyltrimethoxy silane, commercially available from Union Carbide Corp. as silane coupling agent A-187.

The epoxy silane may comprise various non-silyl organic epoxies as additives. Suitable non-silyl organic epoxy additives include neopentylglycol diglycidyl ether, trimethylolpropane triglycidyl ether, cyclohexanedimethanol diglycidylether, hydrogenated Bisphenol A diglycidylether, Bisphenol A diglycidylether, isophthalic acid diglycidylester, hexahydrophthalic acid diglycidylester, glycerol di and triglycidylether, Bis(3-glycidoxypropyl)tetramethyldisiloxane, polyglycidyl hydantoins, $N^1$,N-diglycidyl aniline, N,N,$N^1$,$N^1$-tetraglycidyl methylene dianiline, N,N,$N^1$,$N^1$-tetraglycidyl-m-xylene diamine. Preferably, these additives comprise less than 30% by weight of the epoxy silane.

The amine hardener reacts with the epoxy silane to provide a cured, cross-linked abrasion resistant coating. The term "amine hardener" as used herein refers to any amine functional material that is capable of reaction with the epoxy silane to yield a cross-linked coating. Virtually any primary or secondary amine, whether aromatic, aliphatic or cycloaliphatic is useful. Bi- and multi-dentate amines are preferred; however, monodentate amines may also be used. Preferably the amine is nonvolatile to simplify reaction with the epoxy silane and has the ability to form organometallic complexes, especially metal chelates. In this regard, diamines, triamines and tetraamines are particularly preferred.

Especially useful amines are provided as aminosilanes. Preferred aminosilanes may be represented by the general formula (IV):

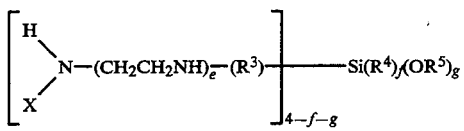

X is either hydrogen or a monovalent aliphatic hydrocarbon radical having less than 10 carbon atoms. $R^3$ is a divalent organic radical which links the amine (NHX) and silyl ($SiR^4$) groups and may be a non-hydrolyzable aliphatic, aromatic or aliphatic/aromatic hydrocarbon moiety having less than 20 carbon atoms or a moiety having less than 20 carbon atoms and further including an ether and/or a thioether linkage. $R^4$ is a monovalent aliphatic hydrocarbon radical having less than 10 carbon atoms and $R^5$ is either a monovalent aliphatic hydrocarbon radical having less than 10 carbon atoms or a monovalent radical of the formula $(CH_2CH_2O)_hT$ in which h is an integer of at least 1 and T is either hydrogen or an aliphatic hydrocarbon radical having less than 10 carbon atoms. The value of e is an integer from 0 to 2, f is 0 or 1, and g is 2 or 3. The sum of f and g is less than or equal to 3.

Some aminosilanes useful in the practice of this invention are described in U.S. Pat. No. 4,378,250 and include aminoethyltriethoxysilane, β-aminoethyltrimethoxysilane, β-aminoethyltriethoxysilane, β-aminoethyltributoxysilane, β-aminoethyltripropoxysilane, α-amino-ethyltrimethoxysilane, α-aminoethyltriethoxysilane, γ-aminopropyltrimethoxysilane, γ-aminopropyltrimethoxysilane, γ-aminopropyltriethoxysilane, γ-aminopropyltributoxysilane, γ-aminopropyltripropoxysilane, β-aminopropyltrimethoxysilane, β-aminopropyltriethoxysilane, β-aminopropyltripropoxysilane, β-aminopropyltributoxysilane, α-aminopropyltrimethoxysilane, α-aminopropyltriethoxysilane, α-aminopropyltributoxysilane, α-aminopropyltripropoxysilane, N-aminomethylaminoethyltrimethoxysilane, N-aminomethylaminomethyltripropoxysilane, N-aminomethyl-β-aminoethyltrimethoxysilane, N-aminomethyl-β-aminoethyltriethoxysilane, N-aminoethyl-β-aminoethyltripropoxysilane, N-aminomethyl-γ-aminopropyltrimethoxysilane, N-aminomethyl-γ-aminopropyltriethoxysilane, N-aminomethyl-γ-aminopropyltripropoxysilane, N-aminomethyl-β-aminopropyltrimethoxysilane, N-aminomethyl-β-aminopropyltriethoxysilane, N-aminomethyl-γ-aminopropyltripropoxysilane, N-aminopropyltripropoxysilane, N-aminopropyltrimethoxysilane, N-(β-aminoethyl)-β-aminoethyltrimethoxysilane, N-(β-aminoethyl)-β-aminoethyltriethoxysilane, N-(β-aminoethyl)-βaminoethyltripropoxysilane, N-(β-aminoethyl)-β-aminoethyltrimethoxysilane, N-(β-aminoethyl)-β-aminoethyltriethoxysilane, N-(β-aminoethyl)-β-aminoethyltripropoxysilane, N-(β-aminoethyl)-β-aminopropyltrimethoxysilane, N-(β-aminoethyl)-γ-aminopropyltriethoxysilane, N-(β-aminoethyl)-γ-aminopropyltripropoxysilane, N-(β-aminoethyl)-γ-aminopropyltrimethoxysilane, N-(β-aminoethyl)-β-aminopropyltriethoxysilane, N-(β-aminoethyl)-β-aminopropyltripropoxysilane, N-(γ-aminopropyl)-β-aminoethyltrimethoxysilane, N-(γ-aminopropyl)-β-aminoethyltriethoxysilane, N-(γ-aminopropyl)-β-aminoethyltripropoxysilane, N-methylaminopropyltrimethoxysilane, β-aminopropylmethyl diethoxysilane, γ-diethylene triaminepropyltriethoxysilane.

Particularly preferred aminosilanes include trimethoxysilylpropyldiethylenetriamine (TMSPDT) and trimethoxysilylpropylethylenediamine (TMSPED), commercially available from Union Carbide Corp. as A-1130 and A-1120, respectively. Another particularly preferred aminosilane is trimethoxysilylpropyltriethyltetraamine (TMSPTT).

Non-silane amines may also be used. Particularly preferred in this category are non-silane amines having the formula (V)

Each L moiety is independently selected from hydrogen or monovalent aliphatic hydrocarbon radicals having less than 10 carbon atoms. $R^6$ is a divalent organic radical such as a non-hydrolyzable aliphatic and/or aromatic moiety, an aliphatic hydrocarbon moiety having less than 20 carbon atoms, or an aliphatic hydrocarbon moiety having less than 20 carbon atoms and further comprising thioether and/or ether linkages. No two heteroatoms (i.e., atoms other than carbon or hydrogen) may be adjacent in the backbone of the divalent radical. Preferably, $R^6$ is a straight chain alkene of the formula $-(CH_2)_n-$. Preferred non-silane amines include ethylene diamine, diethylene triamine, triethylene tetraamine and hexamethylene tetraamine.

As noted hereinabove, it is desirable for coating compositions to be storage stable (i.e., to have a long shelf life). Upon mixing, however, the epoxy silane and amine hardener begin to cross-link (cure). A conventional approach to preventing premature curing is to delay mixing the epoxy silane and the amine until just prior to use. However, this necessitates maintaining separate inventories of the two components and does not alleviate the problem that the curing reaction progresses rapidly after mixing.

In other presently known approaches, the concentration of the amine is reduced by reversibly reacting it with a solvent such as an aldehyde or a ketone to form an imine that is unreactive toward the epoxy silane. Consequently, a one-part formulation may be provided. The amine/imine reaction is in equilibrium and the coating composition is cured by heating which drives off the solvent and increases the concentration of the amine for reaction with the epoxy silane.

Unlike the presently known approaches, the coating compositions of the invention achieve a shelf life of 30 days or more through the use of metal component (atom or ion) containing stabilizers. It is believed that the metal component of the stabilizer is temporarily and reversibly coordinated by the amine, thereby forming an organometallic complex. (As used herein, "organometallic complex" refers to the compound formed by the coordination or union of the metal component and the amine, such structures sometimes being referred to as coordination compounds.) As a result, the amine is made temporarily unavailable for reaction with the epoxy silane. Because, the organometallic complex and any free amine are in equilibrium, over time, free amine is slowly regenerated and reacts with the epoxy silane. Although the coating compositions of the invention slowly cure upon aging, they have a useful shelf life of at least 3 days at room temperature. More preferably, they have a useful shelf live of at least 7 days and most preferably at least 14 days.

Useful stabilizers are based on compounds that contain metal ions having +1, +2 or +3 oxidation states or numbers. Preferably the metal component is derived from the transition elements comprising groups 8 to 12 (inclusive) of the Periodic Table of the Elements (using the IUPAC numbering system adopted in 1985). Also useful are elements from groups 13 and 14 which can form +1 or +2 oxidation states. Ions with a +1 or +2 oxidation state and based on metals having filled "d" shell electronic configurations in their elemental state are particularly preferred because they are substantially colorless Included within this group are $Zn^{+2}$, $Cd^{+2}$ and $Ag^{+1}$. $Cu^{+2}$ is also preferred and, if sightly colored, can be tinted to mask the slight coloration if desired. Other useful metals and their preferred oxidation state (for use in the invention) include ruthenium ($Ru^{+3}$), nickel ($Ni^{+2}$), tin ($Sn^{+2}$), lead ($Pb^{+2}$), cobalt ($Co^{+2}$), palladium ($Pd^{+2}$), and iron ($Fe^{+2}$).

The metal component may be provided by a metal salt such as a metal chloride, metal acetate, metal carboxylate or metal sulfonate, or by metal compounds or metal complexes such as metal acetylacetonates or metal alkoxides. A particularly preferred stabilizer is zinc diacetate. In any event, the metal component of the metal-containing stabilizer should be capable of being strongly coordinated by amines. Preferably, the coordination of the metal component proceeds by chelation which results in the formulation of a metal chelate, a type of coordination compound in which the metal component is centrally positioned and attached to two or more non-metal atoms in the amine.

Typically the stabilized amine is prepared by dissolving the amine and the stabilizer in an appropriate solvent system, the metal component of the stabilizer being coordinated by the amine. Useful solvent systems will dissolve the resulting organometallic complex and, preferably, the epoxy silane. Generally, moderately to highly polar solvent systems (which may include a mixture of more than one solvent) with a boiling point of 120° C. or less at ambient pressure are useful. Some moderately to highly polar solvent systems display medium to strong hydrogen bonding characteristics with a solubility parameter of at least about 7.0 $(cal/cm^3)^{\frac{1}{2}}$.

Examples of suitable solvents include low molecular weight alcohols such as methanol, ethanol, n-propanol, isopropanol, and n-butanol; ketones such as acetone, methyl ethyl ketone, methyl isobutyl ketone, and diacetone alcohol; chlorinated solvents such as methylene chloride and chloroform; ethers such as tetrahydrofuran and diethyl ether; amides such as foramide and dimethyl foramide; glycol ethers such as diethyleneglycol monomethyl ether and ethylene glycol monomethyl ether; esters such as methyl acetate and ethyl acetate; and mixtures thereof. Ketones and alcohols are particularly preferred.

Preferably the stabilizer is used in an amount sufficient to permit substantially all of the amine to participate in the formation of the organometallic complex. However, improved stability results from partial additions. Preferably, the molar ratio of metal atom or metal ion to amine is at least about 0.75:1, more preferably in the range of 0.9:1 to 1.3:1, and most preferably in the range of 0.95:1 to 1.3:1. At concentration ratios outside these ranges, it may be difficult to maintain the metal-amine complex in solution and the end properties of the coating composition may be adversely affected.

The epoxy silane and the amine are preferably combined in a ratio of about 0.3:1 to 3.3:1, based on the number of epoxy groups in the epoxy silane to the number of active hydrogens in the amine. At ratios outside the stated range, the hardness of the coating composition may be adversely affected. More preferably, the epoxy silane and the amine are combined in a ratio of 0.5:1 to 2:1, most preferably 0.67:1 to 1.5:1.

To obtain smooth, uniform coatings, it may be desirable to employ a surfactant to reduce surface tension and to improve substrate wetting. Nonionic surfactants, particularly fluorochemicals, silicones and polyethylene oxide derivatives are preferred. Examples of useful surfactants include nonionic polyethylene oxide derivatives such as TRITON X-100 (Rohm and Haas Co.) and TERGITOL TMN-6 (Union Carbide Corp.); fluorocarbons such as FC-430 and FC-431 (3M Company); and silicone-based materials (block or graft copolymers of lower alkylene oxides and lower dialkyl siloxanes), for example DC-190 (Dow Corning), SF-1066, SF-1141 and SF-1189 (General Electric Co.), BYK-300 (Mallinckrodt Co.) and L-77 and L-540 (Union Carbide Corp.). There is no particular limit on the amount of surfactant which may be used although excessive dilution of the epoxy silane and the amine may adversely affect the abrasion resistance and adhesion properties of the coating.

Most conveniently, coating compositions according to the invention may be prepared as storage stable, "one-part" systems that do not require additional blending by the ultimate user. Generally, the stabilizer is suspended or dissolved in an appropriate solvent and the amine is mixed therewith. The epoxy silane component is separately prepared by diluting with an appropriate solvent such as methanol, ethanol or methyl ethyl ketone and any desired surfactants. The stabilized amine and the epoxy silane solutions are then mixed to provide a one-part, storage stable coating composition according to the invention. The composition remains stable for at least 3 days, more preferably at least 7 days, and most preferably at least 14 days. Of course, the epoxy silane and stabilized amine solutions may be maintained separately until just prior to use.

The "Si—$OR^2$" silicon alkoxy groups of the epoxy silane (formula I) may be prehydrolyzed to silanol (Si—OH) groups before admixing with the amine hardener by blending the epoxy silane with water and a catalyst. This is not preferred as it accelerates the curing process, although for ease of packaging and handling, water may be added in advance. The epoxy silane prehydrolysis may be carried out immediately before admixing with the amine hardener, or the prehydrolysis reaction product may be aged and heated to condense the silanol groups and form epoxy functional siloxane prepolymers. Useful catalysts for the epoxy silane prehydrolysis include strong protonic acids such as hydrochloric acid, bases such as ammonium hydroxide, and fluoride ion. A byproduct of the epoxy silane prehydrolysis reaction is an alcohol ($R^2OH$) which can provide a portion of the solvent system in which the stabilized amine and the "epoxy silane" are dissolved.

If the epoxy silane is not prehydrolyzed before admixing with the amine hardener, it is preferred that silicon alkoxy groups of the epoxy silane as well as those of the aminosilane, if such be used, be hydrolyzed as described below before applying the coating to a substrate.

Once prepared, coating compositions according to the invention may be applied to a substrate by spreading (with a Mayer bar, doctor blade, knife coater or the like), spin coating, or other conventional coating techniques. The coating compositions may be applied to a wide variety of substrates including polymers such as polycarbonate, cellulosic esters, polyesters, polyimides, polyamides, polyolefins, acrylics etc.; metals such as steel, stainless steel, aluminum, copper, zinc, iron, chrome, coinage metals, etc. and alloys thereof; ceramics; glass; wood; and paper. Adhesion to certain substrates may be enhanced by modifying the surface thereof such as by mechanical abrasion (grinding, toughening), or through the use of chemical primers (e.g. silane coupling agents), or by the use of energetic treatments such as corona treating, flame treating, plasma treating and sputter etching.

Various methods may be used to dry and cure the coatings once they have been applied. For example, they may be dried and cured in forced air ovens, under infrared lamps, or in microwave ovens. A preferred method is condensation heating where the coated object is held in the vapor zone of a refluxing inert fluorochemical fluid. The curing temperature may range from 100° to 200° C. depending on the coating composition and the substrate to which it has been applied. The curing is carried out for a time sufficient to produce a hard, abrasion resistant coating and will depend on the temperature at which the cure is conducted. Curing times may range from several minutes to several hours.

It may be desirable for the cured coating to be dyed or tinted, especially if used to protect ophthalmic lenses. Coatings of the present invention can be dyed in aqueous baths of water dispersible dyes at temperatures of about 80° to 95° C. Examples of suitable disperse dyes include SAPPHIRE BLUE and SAPPHIRE BLUE-4G (Ciba-Geigy A.G.), OPHTHALMIC GREY and MOLECULAR CATALYTIC BLACK DYE (Brainpower, Inc.), and SOUTHWEST BLACK 2200 (Diamond Products Co.). MOLECULAR CATALYTIC BLACK DYE is particularly preferred for grey and black dyeing. The dyes may optionally include ultraviolet light absorbers.

Upon mixing of the epoxy silane and the stabilized amine, the resulting coating composition slowly cures (i.e., cross-links, gels, solidifies). Once the coating composition has cured it can no longer be usefully coated onto a substrate. However, the coating compositions of the invention are storage stable. As used herein, "storage stable" means having a useful shelf life at room temperature of at least 3 days, more preferably at least about 7 days, and most preferably at least about 14 days.

Shelf life was qualitatively determined by allowing a bottle containing the coating composition to stand at room temperature. When the viscosity of the coating composition had increased such that the coating composition would no longer flow when the bottle was tipped, the composition was considered to have cured and its shelf life to have expired. More quantitatively, a coating composition was considered to have cured when it could no longer be readily and usefully coated onto a substrate with a #18 Mayer bar at a draw ratio of at least 10 feet per minute (3 meters per minute).

Also as noted above, coating compositions according to the invention are abrasion resistant. Abrasion resistance was determined by coating the composition onto a polymeric substrate at a thickness of about 40 microns ($\mu$m), drying the coated film at room temperature for a time sufficient to remove any volatile solvents, curing the coated film at a temperature and for a time sufficient to yield a useful coating, and measuring the change in percent haze by Taber Abrasion using a Model 503 Abrasion Tester (Teledyne Taber Corp.).

More specifically, an unabrased sample of the coated film was measured for percent haze with a model XL 211 HAZEGUARD instrument (Gardner/Neotec Instrument Division) using the manufacturer's specified procedures. The coated film was then abrased by a Teledyne CS-10F conditioned abraser wheel for 500 cycles, rinsed with deionized water, blotted dry, and measured again for percent haze using the procedure described for the unabrased sample. The numerical difference in percent haze of the abrased and unabrased coated films (i.e., the absolute increase in percent haze) is reported herein as the percent change in haze.

Abraser wheels were conditioned before use and after every 500 abrasing cycles by abrasing alternately on uncoated polyethylene terephthalate film (100 cycles) and Teledyne SF-11 refacing discs (100 cycles and then 10 cycles twice). The wheels were further reconditioned after every 100 abrasing cycles by abrasing 10 cycles on Teledyne SF-11 refacing discs. The percent change in haze is preferably less than 20%, more preferably less than 10%.

Adhesion of a coating composition to a substrate was measured according to International Test Standard ISO 2409 except that the samples were not held under controlled temperature and humidity conditions before testing. In accordance with ISO 2409, a series of 11 parallel lines each 1 millimeter (mm) apart was scored on the surface of a coated substrate. A second series of 11 parallel lines each 1 mm apart and perpendicular to the first set was scored to create a grid of 100 squares each measuring about 1 mm$\times$1 mm. Each scored line was sufficiently deep to fully penetrate the coating composition without puncturing the substrate. SCOTCH brand MAGIC MENDING TAPE 810 (3M Co.) was firmly adhered to the grid and then removed in a rapid, single, continuous motion by pulling at an angle of 90° relative to the substrate. Percent adhesion was measured as the proportion of squares of the original 100 that remained. Preferably the adhesion is at least 95%, more preferably 100%.

Adhesion of a coating composition to a dyed polymer substrate was determined using the procedure described above with a polycarbonate substrate (a conventional ophthalmic lens material) that had been dyed with BPI MOLECULAR BLACK DYE at 90° C. according to the dye manufacturer's recommended procedures.

The invention will be more fully appreciated with reference to the following nonlimiting examples.

EXAMPLE 1

A zinc stabilized aminosilane hardener was prepared by adding 8.1 grams (g) TMSPDT (trimethoxysilylpropyldiethylenetriamine) to a suspension comprising 6.7 g zinc acetate dihydrate in 6.8 g methanol. A hydrolyzed epoxy silane was prepared by adding 6.6 g deionized water and 0.08 g aqueous 1% HCl (hydrochloric acid) to 43.3 g $\gamma$-glycidoxypropyltrimethoxysilane and shaking until a homogeneous solution was obtained.

The stabilized aminosilane hardener and the hydrolyzed epoxy silane were mixed together immediately after preparation and diluted with 100 g of 2-butanone and 5 drops of SF-1189 surfactant (General Electric) to yield a coating composition according to the invention.

When aged in a closed container at room temperature (approximately 22° C.), the coating composition cured to a soft jellylike consistency that would not flow after 48 days based on the qualitative test procedure for shelf life described above. Abrasion resistance was determined by hand spreading the coating composition onto polyester (i.e., polyethylene terephthalate) film using a #18 Mayer bar (available from RD Specialties, Webster, N.Y.), which typically provides for a coating thickness of about 40 μm and curing at 130° C. in a forced air oven for 2 hours. The coating was tested for abrasion resistance according to the procedure described above and was transparent, abrasion resistant, and adherent to the polyester substrate. In a separate experiment, the coating solution was applied to a polycarbonate sheet using a #18 Mayer bar and dried and cured for 2 hours in a 130° C. forced air oven. The coating was tested for adhesion before and after dyeing according to the procedure described above.

Test results are reported in Table 1 for coating compositions that had been aged for various time intervals before being applied to the substrate. A coating prepared from a 35 day-old composition showed no loss of adhesion to polycarbonate even after soaking in hot (90° C.) deionized water for 28 minutes. The dye uptake ability of the coating composition on polycarbonate was assessed by examining the percentage of incident light transmitted through the coated substrate (% T) using a model XL211 Hazeguard instrument available from Gardner/Neotec Instrument Division. Preferably the transmittance after dye uptake is less than 60%, more preferably less than 50%.

TABLE 1

| Coating Age (Days) | Abrasion Resistance (% Change in Haze) | Adhesion Before Dyeing (%) | Adhesion After Dyeing (%) | % T After Dyeing |
|---|---|---|---|---|
| 1 | 8.9 | 100 | 50 | 69 |
| 3 | 5.7 | 100 | 100 | 61 |
| 6 | 6.4 | 100 | 100 | 59 |
| 9 | 7.5 | 100 | 100 | 57 |
| 13 | 7.4 | 100 | 100 | 55 |
| 21 | 5.1 | 100 | 100 | 60 |
| 28 | 5.9 | 100 | 100 | 58 |
| 35 | 5.6 | 100 | 100 | 60 |

Example 1 shows that compositions according to the invention provide coatings with excellent adhesion to unprimed polycarbonate, good dye uptake, resistance to hot water and hot dye solutions, and excellent abrasion resistance. The coating composition was stable for nearly seven weeks when stored at room temperature.

Comparative Example 1

0.23 g deionized water was added to a solution of 1.72 g TMSPDT in 1.4 g methanol to give an amine hardener solution. 3.35 g of the amine hardener were added to 10.0 g of γ-glycidoxypropyltrimethoxysilane hydrolysate (hydrolyzed epoxy silane) prepared by adding 8.5 g deionized water and 0.11 g aqueous 1% HCl to 56.1 g γ-glycidoxypropyltrimethoxysilane, shaking until homogeneous, and aging overnight at room temperature. The resulting hardener plus hydrolyzed epoxysilane were diluted with 21.3 g 2-butanone and 2 drops 25% SF-1189 surfactant in 2-butanone to give a coating composition. The coating composition gelled after 24 hours at room temperature based on the qualitative procedure for shelf life described above.

Fresh (i.e., unaged) composition was spread onto both polyester and polycarbonate substrates in 40 μm thick wet layers and cured for two hours at 130° C. in a forced air oven. The coated polyester substrate had 14.3% haze when subjected to 500 cycles of Taber abrasion. The coated polycarbonate substrate exhibited 100% adhesion and, after dyeing for 8 minutes at 90° C. in BPI MOLECULAR BLACK DYE, exhibited a %T of 68% and 100% adhesion. Adhesion and %T were determined according to the test procedures described above.

Comparative example 1 shows that omitting a stabilizer according to the invention caused the coating composition to gel in less than one day as compared to 48 days for example 1. Coatings prepared from the stabilizer-free composition of comparative example i also exhibited reduced dye uptake (%T=68%) as compared to example 1 (%T=55 to 61%, except for the day old coating composition).

EXAMPLE 2

A zinc stabilized aminosilane hardener was prepared by adding 8.1 g TMSPDT to a suspension comprising 6.7 g zinc acetate dihydrate in 6.8 g diacetone alcohol. 21.7 g of the stabilized aminosilane hardener, 50.0 g of the freshly prepared γ-glycidoxypropyltrimethoxysilane hydrolysate of example 1, and 31.3 g 2-butanone were combined to give a coating composition. After aging for 14 days at room temperature, the coating composition was diluted with an additional 30.4 g of 2-butanone and 2.0 g of a 10% 2-butanone solution of FC-430 surfactant. The diluted solution was spin coated onto polycarbonate at 600 rpm to provide a wet thickness of about 50 μm. The coated sample was dried for 20 minutes at room temperature and then cured in the vapor zone of refluxing 3M Optical Curing Fluid CH 8270 (an inert fluorochemical liquid having a boiling point of 130° C.) for 15 minutes.

When tested according to the procedures described above, the adhesion was 100% and the % change in haze after 500 cycles of Taber Abrasion was 13.3%. When dyed for 24 minutes at 70° C. in BPI MOLECULAR BLACK DYE, the adhesion was still 100% and the %T was 36%.

Example 2 shows that coating compositions of the invention can be formulated for application by spin coating and can be rapidly cured by placing in the vapor zone of a refluxing inert fluorochemical liquid. These features are desirable when coating the backsides of ophthalmic lenses.

EXAMPLE 3

50.3 g trimethoxysilylpropylethylenediamine (TMSPED) were added to a suspension of 49.4 g zinc acetate dihydrate in 49.8 g methanol and the solution was allowed to react overnight at 22° C. to give a metal-stabilized amine hardener. 7.45 g of the stabilized amine hardener were added to 6.03 g of the hydrolyzed epoxy silane of comparative example 1 and diluted with 11.6 g 2-butanone and 1 drop of SF-1189 surfactant to give a coating composition.

When aged in a closed container at room temperature, the coating composition, after 69 days, had cured to a soft jellylike consistency that would not flow. At various times, the coating composition was hand spread onto polycarbonate sheets in a 40 μm thick wet layer, dried and then cured for 2 hours at 130° C. in a forced air oven. The coating was tested for adhesion according to the procedures described above with the results shown below in Table 2. In separate experiments, the coating composition was hand spread onto polyethylene terephthalate film in a 40 μm thick wet layer, dried and then cured for 2 hours at 130° C. in a forced air oven, and the abrasion resistance tested according to the procedures described above. The results of the abrasion resistance testing are shown in Table 2. Example 2 demonstrates the preparation of a coating composition using TMSPED as the amine hardener.

TABLE 2

| Coating Age (Days) | Abrasion Resistance (% Change in Haze) | Adhesion (%) |
|---|---|---|
| 0 | 3.5 | 100 |
| 2 | 3.6 | 99 |
| 6 | 3.8 | 99 |
| 9 | 3.1 | 96 |
| 13 | 3.3 | 99 |
| 21 | 4.0 | 100 |
| 28 | 4.8 | 100 |
| 49 | 4.1 | 100 |

Comparative Example 2

An aminosilane hardener was prepared by adding 0.4 g water to a solution comprising 2.51 g TMSPED in 2.48 g methanol and aging overnight. Hydrolyzed epoxy silane was prepared as described in comparative example 1 and 6.03 g thereof was added to 5.39 g of the aminosilane hardener and the mixture was diluted with 11.6 g of 2-butanone and one drop of 25% SF-1189 in 2-butanone to give a coating composition. The coating composition gelled after overnight storage in a closed container at room temperature. Fresh composition coated onto polycarbonate at a wet thickness of 40 μm and cured for two hours at 130° C. in a forced air oven had 3.3% haze when subjected to 500 cycles of Taber abrasion. The composition displayed 100% adhesion. Comparative example 2 shows that omission of the metal-containing stabilizer from the TMSPED of example 3 causes gellation within 24 hours as compared to 69 days.

EXAMPLE 4

A solution comprising 0.48 g hexamethylenetetraamine (HMTA, a non-silyl amine) in 4.32 g methanol was added to 0.77 g zinc acetate dihydrate in 4.25 g methanol to give a metal-stabilized amine hardener. Hydrolyzed epoxy silane prepared as in comparative example 1 (7.51 g) and 2-butanone (4.61 g) were added to the stabilized amine hardener to form a coating composition. The composition was aged in a closed container at room temperature and solidified after 8 days. After various intervals, the composition was coated onto a polyester substrate at a wet thickness of 40 μm and cured for two hours at 130° C. in a forced air oven before testing for abrasion resistance according to the procedure described above. Results are reported in Table 3. In each case, the coatings were transparent, abrasion resistant and adherent to the polyester substrate. In this example, the utility of non-silyl amines and specifically HMTA as hardeners in coatings of the present invention is demonstrated. intervals and cured for two hours at 130° C. in a forced air oven before testing for abrasion resistance as described above. Results are reported in Table 3. In each case, the coatings were transparent, abrasion resistant and adherent to the polyester substrate. In this example, the utility of non-silyl amines and specifically HMTA as hardeners in coatings of the present invention is demonstrated.

TABLE 3

| Coating Age (Days) | Abrasion Resistance (% Change in Haze) |
|---|---|
| 0 | 7.2 |
| 1 | 8.0 |
| 2 | 8.1 |
| 3 | 7.7 |
| 5 | 7.9 |
| 6 | 7.2 |
| 7 | 8.6 |

Comparative Example 3

0.50 g HMTA was dissolved in 8.55 g methanol and diluted with 5.41 g 2-butanone to give a stabilizer-free amine hardener. SF-1189 surfactant (1 drop) and 7.59 g hydrolyzed epoxy silane prepared as in comparative example 1 were added to the amine hardener to give a coating composition. When handspread onto polyester film at a wet thickness of 40 μm and dried at room temperature, a hazy coating was obtained. After aging for 2 hours at room temperature, the composition was again coated and this time gave a clear coating which was cured by heating at 130° C. in the refluxing zone of an inert fluorochemical fluid for two hours. When subjected to 500 cycles of Taber Abrasion,.the percent haze of the sample was 34.4%. When stored overnight at room temperature, the coating solution solidified to a soft, rubbery gel that did not flow and that could no longer be readily, usefully coated. Comparative example 3 illustrates that omission of the stabilizer causes gelation within 24 hours as compared to 8 days (example 4).

EXAMPLE 5

0.48 g HMTA was dissolved in 6.0 g dimethylformamide (DMF) by warming to approximately 50° C. A solution comprising 0.46 g zinc chloride ($ZNCl_2$) in 3.0 g DMF was added to the HMTA/DMF mixture followed immediately by 7.5 g of the hydrolyzed epoxy silane of comparative example 1. The resulting mixture was diluted with 5 g 2-butanone to give a coating composition. The coating composition, when aged at room temperature, solidified in 20 days. Coatings were prepared by handspreading the coating solution onto polyester film at a wet thickness of 40 μm and curing for 2 hours in a 130° forced air oven. The coatings were tested for abrasion resistance according to procedures described above and with the results reported below in Table 4. After aging for 3 days, 5.0 g of the coating composition was diluted with 2.5 g diacetone alcohol and coated onto a polycarbonate sheet. The coated sample was cured at 130° C. for 2 hours in a forced air oven. When dyed at 90° C. for 10 minutes using BPI MOLECULAR BLACK DYE, the coated sample had a % T of 73% and 100% adhesion.

Example 5 demonstrates that the use of HMTA amine hardener with $ZnCl_2$ stabilizer provides coating compositions having good stability and cured coatings having good hot dye bath stability and abrasion resistance.

TABLE 4

| Coating Age (Days) | Abrasion Resistance (% Change in Haze) |
| --- | --- |
| 0 | 4.3 |
| 1 | 4.0 |
| 2 | 3.4 |
| 3 | 5.8 |
| 4 | 4.7 |
| 5 | 4.7 |
| 6 | 5.4 |
| 7 | 5.7 |
| 8 | 5.7 |
| 12 | 6.0 |

EXAMPLE 6

1.36 g ethylene diamine were added to 3.0 g zinc acetate dihydrate in 12.0 g methanol to give a metal-stabilized amine hardener. 15.0 g of the hydrolyzed epoxy silane of comparative example 1, 30.0 g 2-butanone, and 1 drop SF-1189 surfactant were added to the amine hardener to give a coating composition. The coating composition gelled after aging at room temperature for 33 days. Coatings were prepared by handspreading the coating solution onto polyester film at a wet thickness of 40 μm and curing for 2 hours at 130° C. in a forced air oven. Coated samples were evaluated for abrasion resistance according to the procedures described above and with the results shown below in Table 5. Example 6 describes the effective use of stabilized ethylene diamine as a hardener in the coating compositions of the invention.

TABLE 5

| Coating Age (Days) | Abrasion Resistance (% Change in Haze) |
| --- | --- |
| 0 | 21.0 |
| 2 | 16.4 |
| 4 | 17.1 |
| 6 | 15.8 |
| 8 | 12.2 |
| 16 | 6.1 |
| 24 | 4.9 |
| 32 | 5.3 |

Comparative Example 4

15.0 g of the hydrolyzed epoxy silane of comparative example 1 were added to an amine hardener comprising 1.36 g ethylene diamine in 12.0 g methanol. The resulting mixture was diluted with 30.0 g 2-butanone and two drops of 25% SF-1189 in 2-butanone to give a coating composition which gelled after standing at room temperature for three days. Coatings on polyester film were prepared from fresh composition, and composition which had aged for 1 and 2 days by handspreading the same at a wet thickness of 40 μm and curing for 2 hours at 130° C. in a forced air oven. The coating prepared from fresh composition exhibited 35% haze after 100 cycles of Taber abrasion (abrasion resistance test procedure). Coatings prepared from composition which had aged for 1 and 2 days exhibited 17.5% and 15.1% haze, respectively, after 500 cycles of Taber abrasion. (Older solutions provide harder coatings due to a more complete reaction between the epoxy silane and the amine hardener.)

Comparative example 4 demonstrates that the omission of a metal-containing stabilizer from an amine hardener based on ethylene diamine causes gelation of coating compositions made therewith in 3 days, as compared to 33 days for example 6.

EXAMPLE 7

Triethylenetetraamine hydrate (0.33 g) was added to zinc acetate (0.37 g) in methanol (0.52 g) to give a metal-stabilized amine. To this were added 5.0 g of the hydrolyzed epoxy silane of comparative example 1, 8.23 g 2-butanone, and 1 drop 25% SF-1189 in 2-butanone to give a coating composition. After various time intervals, the coating composition was hand spread at a wet thickness of 40 μm onto a polyester substrate, dried and cured for 2 hours in a 130° C. forced air oven. The coated substrates were tested for abrasion resistance according to the procedure described above and with the results shown below in Table 6. After 37 days storage at room temperature, the coating compositions had not gelled.

Example 7 further demonstrates the use of metal-stabilized non-silyl amines as hardeners for epoxy silane coatings of the present invention. Specifically, when metal-stabilized triethylene tetraamine was used as a hardener, coating compositions made therewith had good storage stability and provided coatings with excellent abrasion resistance.

TABLE 6

| Coating Age (Days) | Abrasion Resistance (% Change in Haze) |
| --- | --- |
| 0 | 7.5 |
| 2 | 7.8 |
| 13 | 10.2 |
| 21 | 8.0 |
| 30 | 7.0 |

Comparative Example 5

Triethylenetetraamine hydrate (0.33 g) was dissolved in methanol (0.43 g) to give an amine hardener. To this were added 5.0 g of the hydrolyzed epoxy silane of comparative example 1, 8.23 g 2-butanone, and 1 drop 25% SF-1189 surfactant in 2-butanone to give a coating composition. After 2 days of storage at room temperature, the coating solution gelled. Coated samples were prepared by handspreading the solution with a #18 Mayer bar, to give a 40 μm thick wet coating on polyester film. The samples were cured for 2 hours at 130° C. in a forced air oven and evaluated for abrasion resistance according to the procedure described above. The percent haze resulting from 500 cycles of Taber abrasion was 25.8% and 29.3%, respectively, for freshly prepared coating solution and coating solution which had been aged for 1 day.

Comparative example 5 indicates that omission of the metal-containing stabilizer from a triethylenetetraamine hardener causes gelation within 2 days as compared to more than 37 days for stabilized compositions (example 7). The coating composition of comparative example 5 is also less abrasion resistant then the coating composition of example 7.

EXAMPLE 8

Zinc acetate dihydrate (2.48 g) was dissolved in a solution of 2.90 g aminopropyltriethoxysilane and 3.80 g methanol to give a metal stabilized amine hardener. A coating composition was prepared by adding a hydrolyzed epoxy silane solution comprising γ-glycidoxypropyltrimethoxysilane (5.33 g), water (0.62) and methylethylketone (5.85 g) to the stabilized amine hardener. The coating composition was aged at room temperature and solidified after 5 days.

Example 8 and the comparative example 6 (following) illustrate that nonchelating aminosilanes are also stabilized by metal complexation in accordance with the invention, although the stabilization effect is not as dramatic as in the case of chelating aminosilanes.

Comparative Example 6

A coating composition was prepared by adding 11.8 g the hydrolyzed epoxy silane solution of example 8 to a solution comprising 2.48 g aminopropyltriethoxy silane and 3.80 g methanol. When aged at room temperature, the composition solidified in 2 days.

EXAMPLE 9

Zinc acetate (2.07 g) was dissolved in a solution of 2.91 g TMSPDT and 3.80 g methanol to give a metal-stabilized amine hardener. A coating composition was prepared by adding 11.8 g of the hydrolyzed epoxysilane of example 8 to the amine hardener. The composition was aged at room temperature and solidified in 42 days.

Comparative Example 7 and Examples 10 to 24

A series of coating compositions was prepared as described above in example 9 except that the metal-containing stabilizer was varied as shown below in Table 7. The resulting coating compositions were stored at room temperature and the time until gelation (i.e., "Gel Time") was recorded based on qualitative shelf life test procedure described above. The compositions of examples 25 and 26 had not gelled even after aging for more than 50 days. In all examples 11.3 moles of the metal-containing stabilizer were used. In comparative example 7 (C.E. 7), no stabilizer was used.

TABLE 7

| Example | Metal-Containing Stabilizer | Gel Time (Days) |
|---|---|---|
| C.E.7 | none | <1 day |
| 10 | RuCl$_3$.H$_2$O | 3 |
| 11 | Ni(OAc)$_2$* | 3 |
| 12 | Zn(acac)$_2$.H$_2$O** | 6 |
| 13 | Sn(OAc)$_2$ | 6 |
| 14 | Pb(OAc)$_2$.3H$_2$O | 6 |
| 15 | Co(OAc)$_2$*** | 9 |
| 16 | Co(OAc)$_2$.4H$_2$O | 11 |
| 17 | Pd(OAc)$_2$ | 12 |
| 18 | Cu(OAc)$_2$.H$_2$O | 20 |
| 19 | Cu(OAc)$_2$.H$_2$O | 21 |
| 20 | Fe(OAc)$_2$ | 23 |
| 21 | Zn(OAc)$_2$.2H$_2$O | 24 |
| 22 | Zn(C$_7$H$_{15}$CO$_2$)$_2$**** | 45 |
| 23 | Ag(CF$_3$CO$_2$) | >51 |
| 24 | Zn(CF$_3$CO$_2$)$_2$ | >60 |

*OAC = acetate
**acac = acetylacetonate
***formed in situ by reaction of Co(OAc)$_2$ with H$_2$O$_2$ and HOAc
****C$_7$H$_{15}$CO$_2$ = 2-ethyl hexanoate These examples show that a wide variety of metal elements found across periodic Table of the Elements groups 8 to 14 may be used in accordance with the invention and that many different metal complexes may be formed therewith to provide metal-stabilized amine hardeners according to the invention.

EXAMPLES 25 to 35

A series of coating compositions was prepared using different amounts of Zn(OAc)$_2$.2H$_2$O (zinc acetate dihydrate)as a metal-containing stabilizer to assess the relationship between gel time and stabilizer concentration. Example 25 was prepared by dissolving zinc acetate dihydrate (1.24 g, 5.65 mmole) in a solution of 2.84 g TMSPDT (10.7 mmole) and 3.87 g methanol to give a stabilized amine hardener. A coating composition was prepared by adding the hydrolyzed epoxy silane of example 9 to the stabilized amine hardener. The coating solutions were aged at room temperature (22° C.) and the time to gelation (i e., "Gel Time") was recorded. Examples 26 to 35 were prepared and evaluated in a similar manner with the zinc acetate dihydrate concentration varied as shown below in Table 8 along with the gel time.

TABLE 8

| Example | Zn(OAc)2.2H$_2$2O (mmoles) | Molar Ratio (Zn:TMSPDT) | Gel Time (Days) |
|---|---|---|---|
| 25 | 5.65 | 0.53:1 | <1 |
| 26 | 6.79 | 0.64:1 | 2 |
| 27 | 7.93 | 0.74:1 | 3 |
| 28 | 8.47 | 0.79:1 | 5 |
| 29 | 9.07 | 0.85:1 | 11 |
| 30 | 9.61 | 0.90:1 | 14 |
| 31 | 10.2 | 0.95:1 | 20 |
| 32 | 10.8 | 1.01:1 | 25 |
| 33 | 11.3 | 1.06:1 | 28 |
| 34 | 12.4 | 1.16:1 | 38 |
| 35 | 13.6 | 1.27:1 | 44 |

Gel time increases with greater amounts of stabilizer. Substantial improvements in stability are obtained with as little as 75% of the stabilizer required to permit all of the amine to participate in the formation of the organometallic complex. Preferably, the ratio of metal ion to amine is at least about 0.75:1, more preferably in the range of about 0.9:1 to 1.3:1, and most preferably 0.95:1 to 1.3:1. These ratios relate to a gel time of preferably at least 3 days, more preferably at least about 14 days, and most preferably at least about 21 days.

Reasonable variations or modifications of the foregoing specification are possible without departing from the scope of the invention which is defined in the accompanying claims.

I claim:

1. An article comprising a substrate having a layer of a coating composition thereon, the coating composition comprising:
   (a) an epoxy component selected from the group consisting of epoxy terminated silanes, aqueous prehydrolysis products of epoxy terminated silanes, prepolymerized epoxy terminated silanes, and epoxy terminated siloxanes;
   (b) an amine hardener that can react with the epoxy component to form a cross-linked coating; and
   (c) a sufficient amount of a metal component-containing stabilizer to delay cross-linking between the epoxy component and the amine hardener.

2. An article according to claim 1 wherein the substrate is a material selected from the group consisting of plastics, metals, ceramics, glass, wood and paper.

3. An article according to claim 2 wherein the substrate is polyester.

4. An article according to claim 2 wherein the coating composition renders the substrate abrasion resistant.

5. An article according to claim 1 wherein the article is an ophthalmic lens.

6. An article according to claim 1 further comprising a primer between the substrate and the layer of the coating composition.

7. An article according to claim 1 wherein the coating composition is dyed.

8. An article according to claim 1 wherein the coating composition exhibits at least 95% adhesion to the substrate.

9. An article according to claim 1 wherein the epoxy component has the structure
wherein:
Q is an $$(Q-R)_{4-a-b}Si(R^1)_a(OR^2)_b$$

epoxy group-containing radical;

R is a divalent organic radical in which no two heteroatoms are adjacent in a backbone of the radical;
$R^1$ is a monovalent hydrocarbon radical;
$R^2$ is a monovalent organic radical;
a is 0 or 1;
b is 2 or 3; and
$a+b \leq 3$.

10. An article according to claim 9 wherein: Q is either

[epoxide structure] or [cyclohexene oxide structure];

R is a divalent non-hydrolyzable aliphatic, aromatic or mixed aliphatic/aromatic hydrocarbon radical having less than 20 carbon atoms or a divalent organic radical having less than 20 carbon atoms and an ether or a thioether linkage; and
$R^1$ is a monovalent aliphatic hydrocarbon radical having less than 10 carbon atoms; and
R2 is selected from the group consisting of monovalent aliphatic hydrocarbon radicals having less than 10 carbon atoms, monovalent acyl radicals having less than 10 carbon atoms, and monovalent radicals having the formula $(CH_2CH_2O)_dZ$ in which d is an integer $\geq 1$ and Z is either hydrogen or a monovalent, aliphatic hydrocarbon radical having less than carbon atoms.

11. An article according to claim 1 wherein the amine hardener is selected from the group consisting of primary amines, secondary amines, aminosilanes and hydrolyzed aminosilanes.

12. An article according to claim 11 wherein the aminosilane' has the formula $$\left[ \begin{array}{c} H \\ \diagdown \\ N-(CH_2CH_2NH)_{\overline{e}}-(R^3)- \\ \diagup \\ X \end{array} \right]_{4-f-g} Si(R^4)_f(OR^5)_g$$

wherein:
X is either hydrogen or a monovalent hydrocarbon radical having less than 10 carbon atoms;
$R^3$ is a divalent organic radical;
$R^4$ and $R^5$ are monovalent hydrocarbon radicals;
e has an integral value of from 0 to 2;
f is 0 or 1;
g is 2 or 3; and
$f+g \leq 3$.

13. An article according to claim 11 wherein the amine hardener has the formula $$\begin{array}{c} H \quad\quad L \\ \diagdown \quad\quad | \\ N-(R^6-N)-L \\ \diagup \\ L \end{array}$$

wherein:
each L is independently selected from the group consisting of hydrogen and monovalent aliphatic hydrocarbon radicals having less than 10 carbon atoms; and
$R^6$ is a divalent organic radical.

14. An article according to claim 1 wherein the metal component of the stabilizer is a metal ion having an oxidation state of +1, +2 or +3.

15. An article according to claim 14 wherein the metal component is derived from a transition element comprising groups 8 to 12 (inclusive) of the Periodic Table of the Elements or is derived from an element comprising groups 13 and 14 of the Periodic Table of the Elements and which has an oxidation state of +1 or +2.

16. An article according to claim 14 wherein the ion is selected from the group consisting of $Ag^{+1}$, $Cd^{+2}$, $Co^{+2}$, $Cu^{+2}$, $Fe^{+2}$, $Ni^{+2}$, $Pb^{+2}$, $Ru^{+3}$, $Sn^{+2}$, and $Zn^{+2}$.

17. An article according to claim 14 wherein the stabilizer is a metal salt.

18. An article according to claim 17 wherein the stabilizer is zinc diacetate.

19. An article according to claim 1 wherein the molar ratio of metal component to amine hardener is in the range of 0.9:1 to 1.3:1.

20. A method of preparing an article comprising a substrate having a layer of a coating composition thereon, the method comprising the steps of:
a) applying a layer of the coating composition to the substrate;
wherein the coating composition comprises:
(i) an epoxy component selected from the group consisting of epoxy terminated silanes, aqueous prehydrolysis products of epoxy terminated silanes, prepolymerized epoxy terminated silanes, and epoxy terminated siloxanes;
(ii) an amine hardener that can react with the epoxy component to form a cross-linked coating; and
(iii) a sufficient amount of a metal component-containing stabilizer to delay crosslinking between the epoxy component and the amine hardener until heated; and
b) heating the coated substrate for a time and at a temperature sufficient to cause the composition to form a crosslinked coating on a surface of the substrate.

21. An article according to claim 2 wherein the substrate is polycarbonate.

22. An article comprising a substrate having a layer of crosslinked coating composition thereon, the coating composition comprising:
(a) the reaction product of:
(i) an epoxy component selected from the group consisting of epoxy terminated silanes, aqueous prehydrolysis products of epoxy terminated silanes, prepolymerized epoxy terminated silanes, and epoxy terminated siloxanes; and
(ii) an amine hardener; and
(b) a sufficient amount of a metal component-containing stabilizer that delayed crosslinking between the epoxy component and the amine hardener until the coating was cured.

* * * * *

UNITED STATES PATENT AND TRADEMARK OFFICE
CERTIFICATE OF CORRECTION

PATENT NO.:     5,395,697

DATED:          March 7, 1995

INVENTOR(S):    Morrison

It is certified that error appears in the above-identified patent and that said Letters Patent is hereby corrected as shown below:

Column 19, line 44, "less than carbon atoms." should read --less than 10 carbon atoms.--

Signed and Sealed this

Twenty-first Day of May, 1996

Attest:

BRUCE LEHMAN

Attesting Officer          Commissioner of Patents and Trademarks